United States Patent [19]

Rozman et al.

[11] Patent Number: 4,942,493
[45] Date of Patent: Jul. 17, 1990

[54] METHOD AND APPARATUS FOR DETECTING PRIME MOVER START MALFUNCTION

[75] Inventors: Gregory I. Rozman; Paul G. Baits, both of Rockford, Ill.

[73] Assignee: Sundstrand Corporation, Rockford, Ill.

[21] Appl. No.: 265,953

[22] Filed: Nov. 2, 1988

[51] Int. Cl.⁵ .............................................. H02H 5/00
[52] U.S. Cl. ...................................... 361/23; 322/29; 290/38 R; 290/4 R
[58] Field of Search ...................... 361/23; 322/10, 11, 322/29; 318/147, 461, 465, 484; 290/12, 22, 38 R, 40 A, 41 C, 46

[56] References Cited

U.S. PATENT DOCUMENTS

| | | | |
|---|---|---|---|
| 4,288,828 | 9/1981 | Kuntner et al. | 361/31 |
| 4,330,743 | 5/1982 | Glennon | 322/29 X |
| 4,481,459 | 11/1984 | Mehl et al. | 322/10 |
| 4,661,762 | 4/1987 | Baker | 322/29 X |
| 4,841,216 | 6/1989 | Okada et al. | 290/38 R X |

OTHER PUBLICATIONS

D.E. Baker, "DC Link USCF Starter/Generator Systems", SAE Technical Paper Series 871887, copyright 1987.

Primary Examiner—Derek S. Jennings
Attorney, Agent, or Firm—Marshall, O'Toole, Gerstein, Murray & Bicknell

[57] ABSTRACT

Generating systems are operable in a starting mode to provide motive power to a prime mover to bring it up to a self-sustaining condition. However, a malfunction in a component connected between the generating system and the prime mover or in the prime mover itself may cause a potentially damaging condition to arise. In order to overcome this problem, a system for detecting, for example, the failure of a prime mover to achieve a self-sustaining condition continuously senses speed and acceleration of the prime mover, determines a minimum acceleration during a particular speed range, compares the minimum acceleration to prime mover acceleration at a point outside of the speed range and develops a signal to indicate no ignition if the minimum acceleration is greater than the acceleration at the point outside of the speed range.

14 Claims, 3 Drawing Sheets

METHOD AND APPARATUS FOR DETECTING PRIME MOVER START MALFUNCTION

TECHNICAL FIELD

The present invention relates generally to malfunction detection systems, and more particularly to a system which detects when a generating system, when operating in a starting mode, fails to properly start a prime mover connected thereto.

BACKGROUND ART

Power generating systems have been devised wherein variable speed motive power produced by a prime mover is converted into constant frequency electrical power which is supplied to one or more loads. Typically, the conversion is effected by a synchronous generator driven by a constant speed drive which is in turn coupled to the output of the prime mover. An alternative to such a generating system is known as a variable speed constant frequency (VSCF) generating system that includes a synchronous generator which receives the variable speed motive power produced by the prime mover and a power converter which converts the resulting variable frequency output of the generator into constant frequency power for the loads. Interest in VSCF systems has increased of late owing to the push to design "all electric" aircraft in which the use of mechanical, hydromechanical and hydraulic components is minimized.

It has been recognized that the generator in a generating system can be used in a starting mode to provide motive power to the prime mover to accelerate the latter up to self-sustaining speed, at which point a self-sustaining condition may be achieved. Such a system is disclosed in a paper entitled "DC Link VSCF Starter/Generator Systems", by D. E.. Baker, SAE Technical Paper Series No. 871887, copyright 1987. In the system described in this paper, external power is provided to the power converter which in turn is controlled to provide electrical power to the generator. The generator is thus operated as a motor to provide the required motive starting power to the prime mover.

A further power generating system which is operable in a starting mode to provide motive power to a prime mover is disclosed in Mehl et al. U.S. Pat. No. 4,481,459.

During operating in the starting mode, one or more malfunctions may occur which can cause damage to or destruction of system components. For example, the prime mover may fail to ignite (or "light-off") and thus fail to reach a self-sustaining condition. As a result of such malfunction, the generator may be operated to provide motive power to the prime mover for an excessive period of time, in turn leading to potential damage.

Alternatively, the generator may become disconnected from the prime mover due to breakage of a shaft, failure of a gear box between the prime mover and generator or for another reason. In this case, the generator will experience a low inertia condition during the start mode and may accelerate rapidly to potentially damaging speeds.

In addition to the foregoing, the prime mover may stall during operation in the start mode. This can result in the generator failing to accelerate the prime mover to the self-sustaining speed within a preselected maximum starting period. Such a condition can also result in damage to the generator as well as to electrical system components in the converter.

For the foregoing reasons, it is desirable to detect a malfunction when operating in the starting mode at the earliest possible time so that the starting mode operation can be terminated to prevent excessive wear and damage to the generator or other components.

Kuntner et al. U.S. Pat. No. 4,288,828 discloses a protection system for an electric motor which drives high inertia loads that require relatively long acceleration times. The protection system deenergizes the motor when the motor exceeds a preset time limit to reach normal running speed. The protection system includes a timer which is enabled upon a start command from an operator. During subsequent acceleration of the motor, current sensing transformers connected to the motor develop a speed signal representing the speed of the motor. A comparator compares the speed signal against a reference signal which represents the normal running speed and develops an up-to-speed signal at an output when the speed signal reaches the reference signal. If the motor reaches normal running speed within the preset time limit, the up-to-speed signal resets the timer before expiration thereof to prevent the timer from developing an output representing an error condition.

The above-identified Kuntner et al. patent does not detect the failure of a prime mover to attain a self-sustaining speed during a start mode, a low inertia condition caused by a broken shaft or gear box or a prime mover stall condition.

SUMMARY OF THE INVENTION

In accordance with the present invention, a method and apparatus for detecting a prime mover start malfunction provides an indication of a no ignition, low inertia or prime mover stall condition in a simple and effective manner.

More particularly, a system for detecting the failure of a prime mover to ignite within a prime mover speed range in which the prime mover is expected to achieve a self-sustaining condition continuously senses speed and acceleration of the prime mover and determines the minimum prime mover acceleration encountered while operating within the speed range. The minimum acceleration in the speed range is compared to the acceleration of the prime mover at a point outside of the speed range and, if the minimum acceleration is greater than the acceleration at the point outside of the speed range, a signal is developed to indicate a no ignition condition.

In the preferred embodiment, the minimum prime mover acceleration while operating in the speed range is determined by continuously comparing signals representing the acceleration of the prime mover in the speed range against a previously stored value, and replacing the previously stored value with a value representing the current acceleration if the current acceleration signal is less than the stored value.

Also in the preferred embodiment, the prime mover acceleration is compared against a predetermined maximum acceleration and, if the prime mover acceleration exceeds the maximum while operating in a certain speed range, a signal is generated indicating a low inertia condition.

The system of the present invention also generates an engine stall signal when the speed of the prime mover has failed to reach a predetermined speed within a certain time period following issuance of a start command.

The system of the present invention is particularly adapted for use with a VSCF power generating system which is operable in a start mode, although it is not necessarily limited to use with such a system. In addition, the system uses relatively few components, and thus is simple in design.

DESCRIPTION OF THE PREFERRED EMBODIMENT

Figure 1:
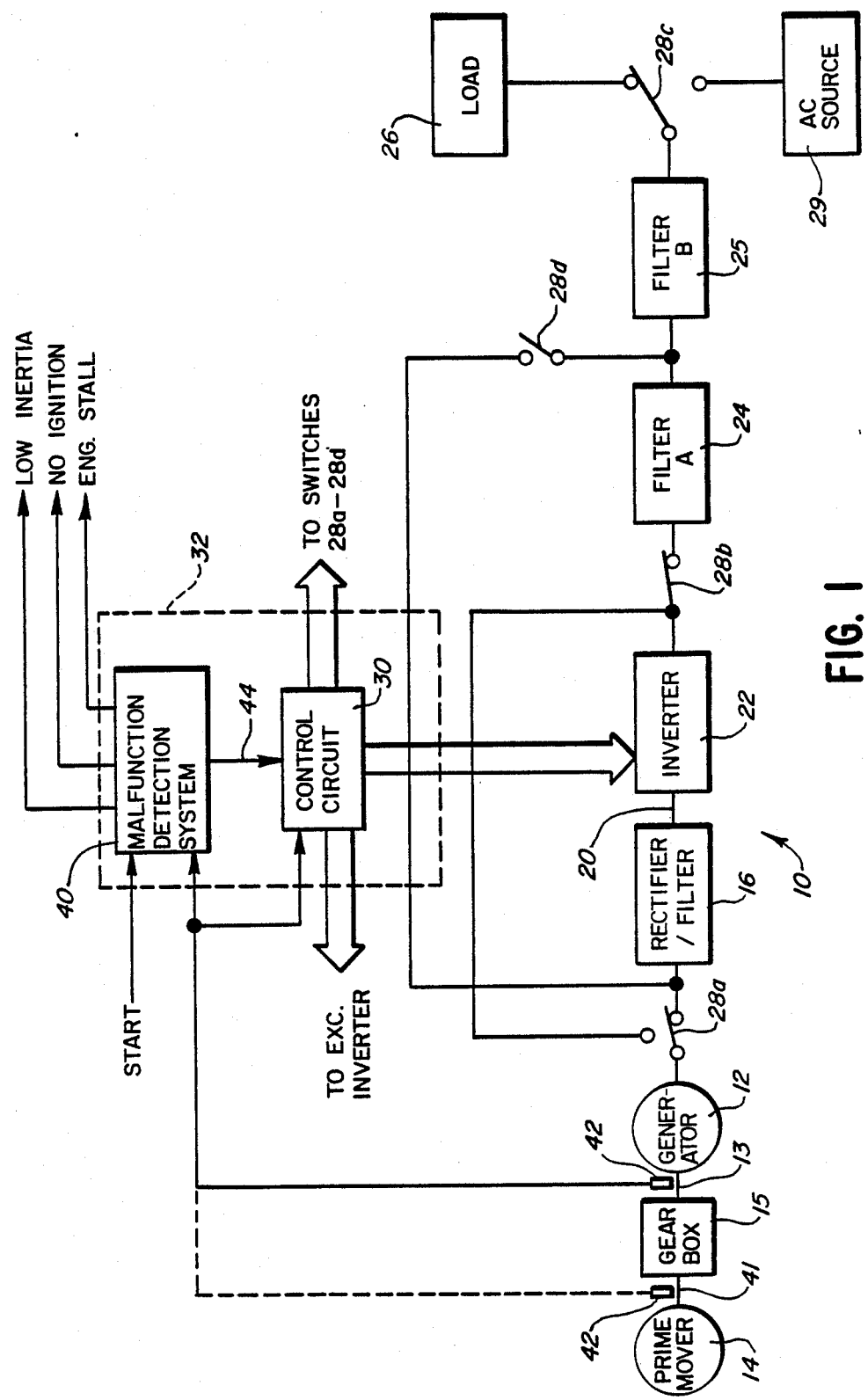
FIG. 1 is a block diagram of a variable speed constant frequency (VSCF) power generating system which is operable in generating and starting modes.

Referring now to FIG. 1, a variable speed constant frequency (VSCF) system 10 is illustrated. The system 10 includes a brushless synchronous generator 12 having a rotor (not shown) coupled to a motive power shaft 13 which is driven by a prime mover 14 via a gear box 15. The prime mover may be, for example, an aircraft jet engine. The generator 12 develops polyphase variable frequency AC output power which is converted into DC power by a rectifier/filter 16. The DC power is provided over a DC link 20 to a power converter in the form of an inverter 22 which includes switches that are operated in a generating mode to convert the DC power into polyphase constant frequency AC power. The AC power is filtered by first and second filters 24, 25 and is provided to one or more AC loads 26.

The system 10 includes switches 28 which are controlled by a control circuit 30 of a generator/converter control unit (G/CCU) 32 which operate the system 10 in the generating mode or a starting mode. The switches 28 are illustrated in FIG. 1 as being four in number, designated 28a-28d, although it should be realized that each switch is replaced by three switches if the generator 12 and converter 22 are three phase power sources.

When the switches are in the position shown in FIG. 1, the generating system 10 is in the generating mode whereby the inverter switches are operated so that power flows from the prime mover 14 to the load 26. When the switches are moved to the positions opposite those shown in FIG. 1, the input of the rectifier/filter 16 is coupled through the second filter 25 to an external AC power source 29. In addition, the output of the converter 22 is coupled to armature windings of the generator 12. The inverter switches are controlled in the starting mode by the control circuit 30 so that power is provided from the AC source 29 to the generator armature windings. In addition, when operating in the starting mode, the control circuit 30 provides power to the exciter so that the generator 12 operates as a motor to develop motive power which is returned through the gear box 15 to the prime mover 14 to bring it up to self-sustaining speed.

The operation of the control circuit 30 in the generating and starting modes to control the switches of the inverter 22 and the application of power to the generator 12 is unimportant to an understanding of the present invention and hence will not be described in greater detail.

The G/CCU 32 further includes a malfunction detection system 40 according to the present invention which receives a generator shaft or prime mover shaft position signal representing the position of the shaft 13 or a shaft 41 between the prime mover 14 and the gear box 15, respectively, from a position sensor 42. The system 40 develops one or more of three signals representing a low inertia condition, a no ignition condition and an engine stall condition. These signals may be provided to an on-board flight computer, if desired, to one or more indicators which are visible to a pilot of the aircraft and/or to the control circuit 30 over a line 44.

Figure 2:
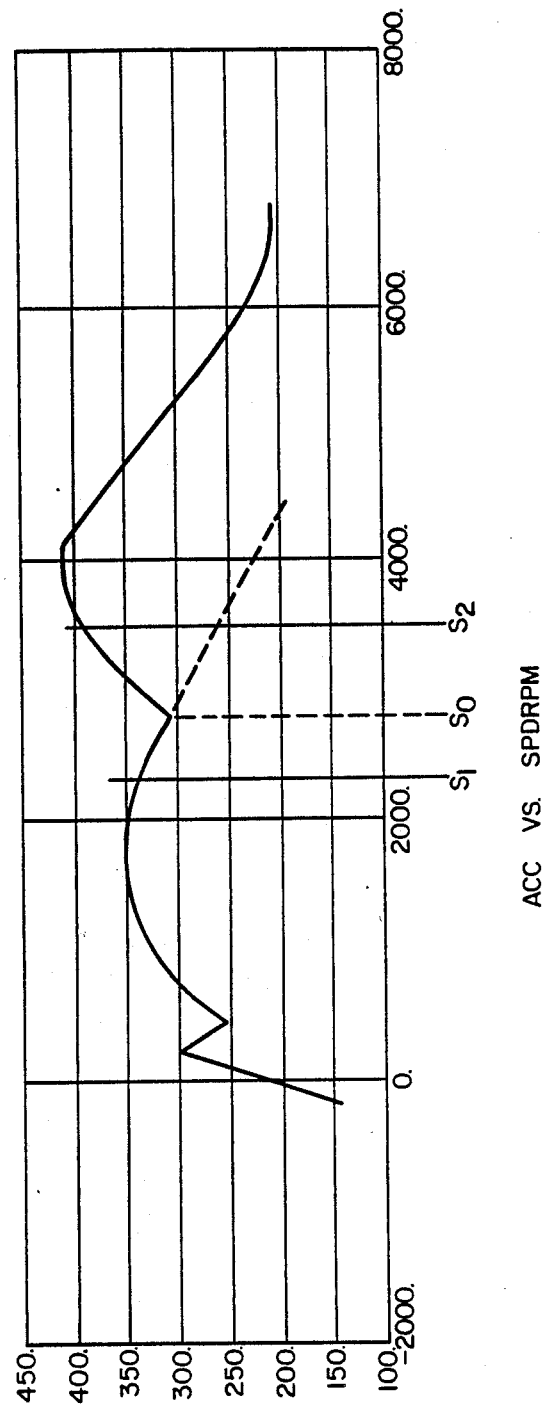
FIG. 2 is a graph illustrating prime mover acceleration versus speed during operation in the start mode.

Referring now to FIG. 2, there is shown a graph illustrating prime mover acceleration as a function of speed during operation in the starting mode. The solid line graph illustrates the prime mover acceleration which normally occurs when the prime mover achieves light-off at a speed $S_0$. The dotted line graph illustrates prime mover acceleration when light-off fails to occur. Light-off is expected to occur within a speed range bounded by lower and upper speed limits $S_1$ and $S_2$. From the solid line graph of FIG. 2, it can be seen that, should light-off occur, the minimum prime mover acceleration encountered in the speed range between speeds $S_2$ and $S_2$ will be less than the acceleration at speeds immediately greater than the speed $S_2$. On the other hand, if light-off does not occur, the minimum acceleration in the speed range between speeds $S_1$ and $S_2$ will be greater than the prime mover acceleration in the speed range above $S_2$. Thus, the system of the present invention detects the minimum prime mover acceleration in the speed range bounded by the speeds $S_1$ and $S_2$ and compares such minimum acceleration to the prime mover acceleration outside of such speed range to determine whether light-off has occurred.

Figure 3:
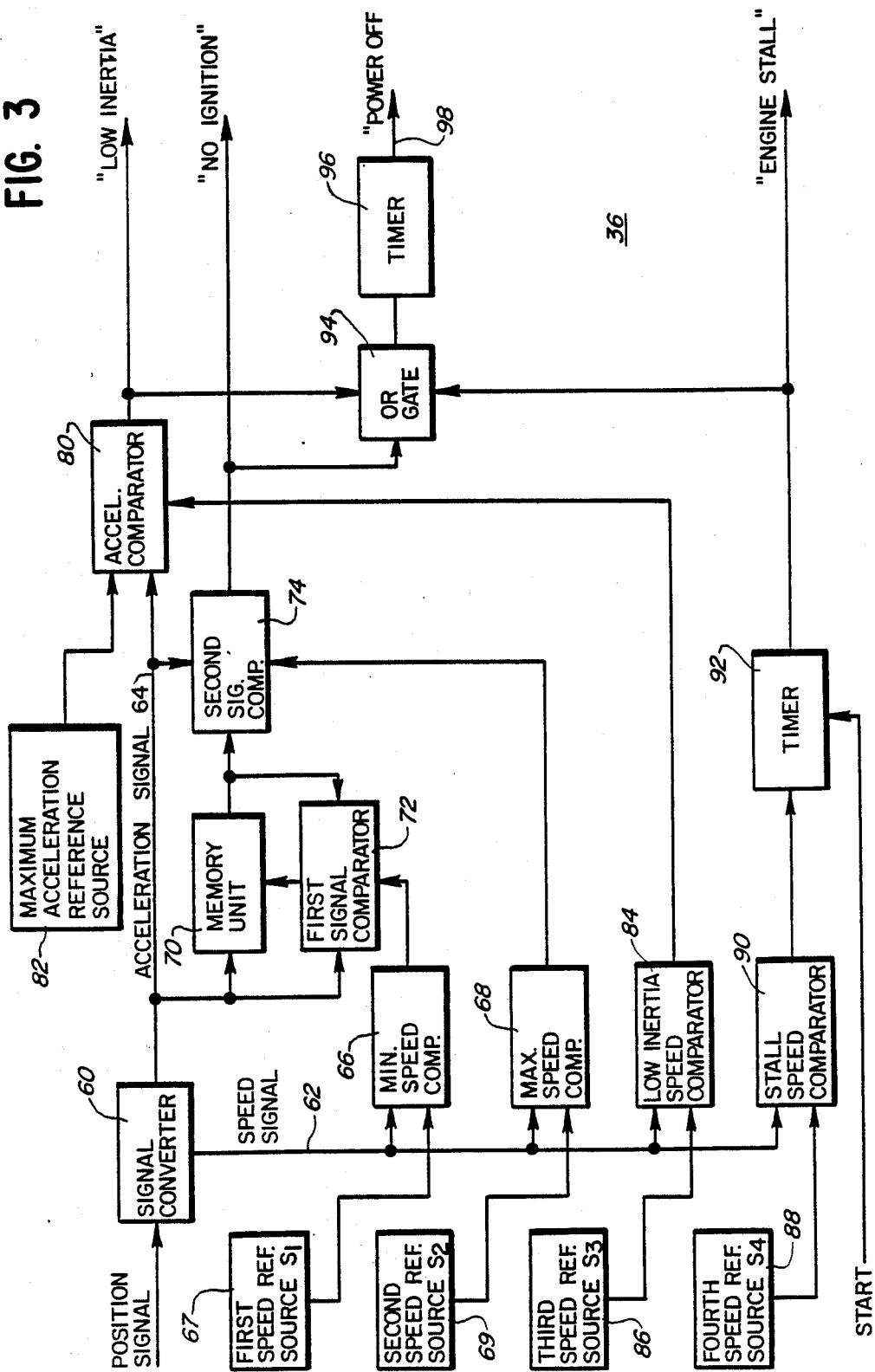
FIG. 3 is a block diagram of the malfunction detection system illustrated in FIG. 1.

Referring now to FIG. 3, there is illustrated the malfunction detection system 40 of the present invention. The system 40 includes a signal converter 60 which converts the shaft position signal developed by the position sensor 42 into a speed signal on a line 62 representing the speed of the prime mover 14 and an acceleration signal on a line 64 representing the acceleration of the prime mover 14 for the case where the speed sensor 42 senses the position of the shaft 41. If the position sensor 42 senses the position of the shaft 13, the signals on the lines 62 and 64 represent the speed and acceleration of the generator 12. Hereinafter, it will be assumed that the sensor 42 detects the position of the shaft 41.

The speed signal 62 is coupled to minimum and maximum speed comparators 66, 68 which also receive first and second reference signals representing the speeds $S_2$ and $S_2$, respectively, as developed by reference signal sources 67, 69.

The acceleration signal on the line 64 is coupled to a memory 70 and to a first signal comparator 72. The signal comparator 72 is enabled by the minimum speed comparator 66 when the speed of the prime mover exceeds the speed $S_1$. Once the signal comparator 72 is enabled, it compares the current acceleration of the prime mover, as represented by the signal on the line 64, against an acceleration value stored in the memory unit 70. When the current acceleration is less than the acceleration represented by the value stored in the memory 70, the signal comparator 72 issues a storage signal to cause the memory 70 to replace the previous acceleration value with a value representing the current acceleration of the prime mover.

Once the speed of the prime mover exceeds the speed $S_2$, the maximum speed comparator 68 enables a second signal comparator 74 which then compares the value stored in the memory unit 70 against the current acceleration of the prime mover 14. From the foregoing discussion, it can be seen that the value stored in the memory 70 represents the minimum prime mover acceleration encountered in the speed range between the speeds $S_1$ and $S_2$. If the current acceleration is less than the value stored in the memory unit 70, the comparator 74 develops the no ignition signal to indicate that the prime mover has failed to ignite in a speed range in which a self-sustaining condition should have occurred.

The acceleration signal on the line 64 is also coupled to an acceleration comparator 80 which further receives a signal representing a predetermined maximum acceleration reference as developed by a reference source 82. The acceleration comparator 80 is coupled to a low inertia speed comparator 84 which develops an enable signal when the generator rotor speed exceeds a third speed reference representing a speed $S_3$ as developed by a source 86. The acceleration comparator 80, once enabled by the comparator 84, compares the current acceleration as represented by the signal on the line 64 against the maximum acceleration reference developed by the source 82. When the prime mover acceleration exceeds the reference, a low inertia signal is developed indicating that prime mover acceleration is excessive. As previously noted, this may be due to breakage of the shaft interconnecting the generator to the gear box 15 or the shaft 41 interconnecting the gear box 15 to the prime mover 14 or a failure in the gear box 15 itself.

The circuit of FIG. 3 also includes means for developing a signal representing stalling of the prime mover 14. Such means comprises a fourth speed reference source which develops a signal representing a speed $S_4$, a stall speed comparator 90 which compares the generator speed as represented by the signal on the line 62 against the reference developed by the source 88 and a timer 92 which is enabled to time a predetermined period upon issuance of a start command by an operator or other command source. The timer 92 will generate an engine stall signal if the comparator 90 does not develop a signal which indicates that the speed of the generator 13 has exceeded the speed $S_4$. On the other hand, if the comparator 90 determines that the generator speed exceeds the speed $S_4$ prior to expiration of the time period measured by the timer 92, a reset signal is developed by the comparator 90 which is applied to a reset input of the timer 92 to prevent the timer 92 from issuing the engine stall signal.

Each of the no ignition, low inertia and engine stall signals may be coupled to an OR gate 94 which is in turn coupled to a timer 96. The OR gate 94 and timer 96 may initiate a "power off" signal on a line 98 which in turn causes the G/CCU 30 to remove power from the generator 12 so that the start mode operation is inhibited when a malfunction is detected.

It should be understood that the present invention may be implemented using digital control techniques, for example by means of a suitably programmed microprocessor, and hence the invention should not be considered as being limited to the particular embodiment shown in the figures.

While the system 40 of the present invention has been illustrated in conjunction with a VSCF system, it can be seen that the system is usable with other types of starting systems, and hence the system of the present invention has wide applicability.

We claim:

1. A method of detecting the failure of a prime mover to achieve a self-sustaining condition within a speed range as the prime mover is being accelerated during operation in a starting mode, comprising the steps of:
   continuously sensing speed and acceleration of the prime mover;
   determining a minimum prime mover acceleration during the speed range;
   comparing the minimum prime mover acceleration to prime mover acceleration at a point outside of the speed range; and
   developing a malfunction signal if the minimum acceleration is greater than the acceleration at the point outside of the speed range.

2. The method of claim 1, wherein the step of determining the minimum prime mover acceleration includes the step of storing a value representing the prime mover acceleration in a memory while in the speed range if the prime mover acceleration is less than an acceleration represented by a previously stored value wherein at an upper limit of the speed range the stored value represents the minimum prime mover acceleration during the speed range.

3. The method of claim 1, comprising the further step of developing a power off signal at an end of a delay period following development of the malfunction signal wherein the power off signal is used to terminate operation in the starting mode.

4. A device for detecting the failure of a prime mover to ignite within a speed range in which the prime mover is expected to achieve a self-sustaining condition, comprising:
   means for developing a speed signal representing speed of the prime mover and an acceleration signal representing acceleration of the prime mover;
   a minimum speed comparator having a first input which receives the speed signal, a second input which receives a minimum speed reference signal representing a lower limit of the speed range and an output which generates a first enable signal when the speed signal is greater than the minimum speed reference signal;
   a memory having a first input which receives the acceleration signal, a store input which is responsive to a store signal to cause storage of a value representing the acceleration signal and an output which develops a signal representing the value stored in the memory;
   a minimum acceleration signal comparator having a first comparison input which receives the acceleration signal, a second comparison input coupled to the memory output, an enable input responsive to the first enable signal and an output connected to the store input of the memory wherein the minimum acceleration signal comparator develops a store signal at its output when the acceleration signal is less than the signal representing the value stored in the memory and when the prime mover speed is greater than the lower limit of the speed range;
   a maximum speed comparator having a first input which receives the speed signal and a second input which receives a maximum speed reference signal which represents an upper limit of the speed range and an output which develops a second enable signal when the speed signal is greater than the maximum speed reference signal; and a no ignition signal comparator having a first comparison input which receives the acceleration signal, a second comparison input which receives the signal representing the value stored in the memory, an enable input which responsive the second enable signal and an output which develops a no ignition signal when the acceleration signal is less than the signal representing the value stored in the memory and when the prime mover speed is greater than the upper limit of the speed range.

5. The device of claim 4, wherein the means for developing the speed signal and the acceleration signal includes a position detector which develops a position signal based on a position of a shaft coupled to the prime mover and a signal converter which converts the position signal into the speed and acceleration signals.

6. The device of claim 4, further comprising a power off timer having an input connected to the output of the no ignition signal comparator and an output which develops a power off signal a certain time period after the no ignition signal is developed.

7. A method of detecting when a motor is disconnected from a load, comprising the steps of:
sensing speed and acceleration of the motor;
comparing the acceleration of the motor above a certain speed to a maximum acceleration; and
developing a signal to indicate that the motor is disconnected from the load when the acceleration of the, motor above the certain speed is greater than the maximum acceleration.

8. The method of claim 7, wherein the motor includes a shaft and wherein the step of sensing the speed and acceleration of the motor includes the steps of continuously sensing the position of the shaft, developing a position signal representing the sensed shaft position, and deriving signals representing the motor speed and acceleration from the position signal.

9. The method of claim 7, including the further steps of starting a power off timer after developing the signal indicating the prime mover is disconnected from the shaft and developing a power off signal when the timer times a predetermined time period.

10. A device for detecting when a generator operating as a motor in a starting mode to start a prime mover is disconnected from the prime mover, comprising:
means for sensing the speed and acceleration of the generator;
a low inertia speed comparator coupled to the sensing means which develops a low inertia enable signal when the generator speed is greater than a particular speed; and
a low inertia acceleration comparator coupled to the sensing means and to the low inertia speed comparator which develops a low inertia signal when the acceleration of the generator is greater than a maximum acceleration during the time the low inertia enable signal is developed.

11. The device of claim 10, wherein the generator is coupled to a shaft and wherein the sensing means comprises a position detector which develops a position signal based on the position of the shaft and a signal converter which converts the position signal into speed and acceleration signals.

12. The device of claim 10, further comprising a power off timer coupled to the low inertia comparator which develops a power off signal a predetermined time following development of the low inertia signal.

13. A method of detecting a stall condition during operation in a starting mode wherein a generator is operated as a motor to accelerate a prime mover up to self-sustaining speed, comprising the steps of:
continuously sensing the speed of the prime mover;
starting a timer at the beginning of operation in the starting mode;
resetting the timer when a particular speed of the prime mover has been reached during operation in the starting mode; and
developing an engine stall signal if the timer expires before being reset.

14. The method of claim 13, wherein the step of continuously sensing the speed of the prime mover includes the steps of continuously sensing a position of a shaft coupled to the prime mover, developing a position signal from the sensed shaft position and deriving the speed from the position signal.

* * * * *